(12) United States Patent
Okajima et al.

(10) Patent No.: US 7,006,121 B2
(45) Date of Patent: Feb. 28, 2006

(54) VIRTUAL TERMINAL CONFIGURING METHOD AND DEVICE

(75) Inventors: Ichiro Okajima, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 421 days.

(21) Appl. No.: 09/745,546

(22) Filed: Dec. 26, 2000

(65) Prior Publication Data

US 2001/0021246 A1    Sep. 13, 2001

(30) Foreign Application Priority Data

Dec. 28, 1999    (JP) ................................. 11-375794

(51) Int. Cl.
  *H04N 7/14* (2006.01)
(52) U.S. Cl. .............................. 348/14.01; 348/14.03; 348/14.11; 370/252
(58) Field of Classification Search .. 348/14.01–14.04, 348/14.07–14.13; 345/753; 709/201–204; 370/252, 260–263, 352; 379/93.21, 202.01, 379/265.09

See application file for complete search history.

(56) References Cited

U.S. PATENT DOCUMENTS

| | | | | |
|---|---|---|---|---|
| 5,392,284 A | * | 2/1995 | Sugiyama | 370/465 |
| 5,477,546 A | * | 12/1995 | Shibata et al. | 370/260 |
| 5,675,375 A | * | 10/1997 | Riffee | 348/14.1 |
| 5,689,553 A | * | 11/1997 | Ahuja et al. | 379/202.01 |
| 5,737,321 A | * | 4/1998 | Takahashi | 370/263 |
| 5,887,136 A | * | 3/1999 | Yasuda et al. | 709/204 |
| 5,946,386 A | | 8/1999 | Rogers et al. | 379/265.09 |
| 5,991,795 A | | 11/1999 | Howard et al. | 709/201 |
| 6,020,915 A | * | 2/2000 | Bruno et al. | 348/14.09 |
| 6,100,918 A | * | 8/2000 | Lu | 348/14.08 |
| 6,115,372 A | * | 9/2000 | Dinha | 370/352 |
| 6,163,335 A | * | 12/2000 | Barraclough | 348/14.08 |
| 6,219,409 B1 | * | 4/2001 | Smith et al. | 379/106.09 |
| 6,356,533 B1 | * | 3/2002 | Bruno et al. | 370/252 |

FOREIGN PATENT DOCUMENTS

| | | | |
|---|---|---|---|
| EP | 674420 A1 | * | 9/1995 |
| EP | 0 942 554 | | 9/1999 |
| WO | WO 97/46073 | | 12/1997 |

OTHER PUBLICATIONS

R. Mohan, et al., IEEE Global Telecommunications Conference, vol. 4, pp. 2015-2021, XP-000951336, "Content Adaptation Framework: Bringing the Internet to Information Applicances", Dec. 5, 1999.

* cited by examiner

*Primary Examiner*—George Eng
(74) *Attorney, Agent, or Firm*—Oblon, Spivak, McClelland, Maier & Neustadt, P.C.

(57) ABSTRACT

Terminal management information concerning a plurality of communication terminals of a user is managed. When a call addressed to the user is initiated, one or more terminals that can accept the call is identified by referring to an ability needed for a communication involved in the call and the terminal management information concerning the plurality of communication terminals managed by the step (a). Information involved in the call into items of information to be sent to the above one or more terminals identified by the step (b) and combining items of information from the above one or more terminals identified by the step (b) is separated into information to be sent to one of the plurality of communication terminals that initiates the call. A virtual terminal is formed by the above one or more terminals identified by the step (b) and communicates with the above one of the plurality of communication terminals.

22 Claims, 8 Drawing Sheets

VIRTUAL TERMINAL CONFIGURING METHOD AND DEVICE

BACKGROUND OF THE INVENTION

1. Field of the Invention

The present invention relates to a virtual terminal configuring method and device, and more particularly to a virtual terminal configuring method and device in which a virtual terminal is formed by combining a plurality of terminals.

2. Description of the Related Art

FIG. 1 is a diagram of a conventional videophone communication system. A videophone terminal 10 owned by user A and a videophone terminal 12 owned by user B are mutually connected via a network 14 such as an ISDN (Integrated Services Digital Network). Video information and voice information are transferred between the videophone terminals 10 and 12 via the network 14. The videophone terminals 10 and 12 communicate with each other by using a video and voice compression coding rule and protocol for ISDN.

Conventionally, videophone communications can take place only when both the users A and B have the videophone terminals using the same video and voice compression coding rule and protocol.

Nowadays, users have various kinds of communication terminals such as cellular phones, PDA (Personal Digital Assistants), and personal computers. When the users wish to use a new communication service such as videophone communications, the users are required to prepare a new terminal such as a videophone terminal.

SUMMARY OF THE INVENTION

It is a general object of the present invention to overcome the above disadvantage.

A more specific object of the present invention is to provide a virtual terminal configuring method and device in which a plurality of terminals are arranged so as to form a virtual terminal capable of handing various types of communications.

The above objects of the present invention are achieved by a method comprising the steps of: (a) managing terminal management information concerning a plurality of communication terminals of a user; (b) identifying, when a call addressed to the above user is initiated, one or more terminals that can accept the call by referring to an ability needed for a communication involved in the call and the terminal management information concerning the plurality of communication terminals managed by the step (a); and (c) separating information involved in the call into items of information to be sent to the above one or more terminals identified by the step (b) and combining items of information from the above one or more terminals identified by step (b) into information to be sent to one of the plurality of communication terminals that initiates the call. A virtual terminal is formed by the above one or more terminals identified by the step (b) and communicates with the above one of the plurality of communication terminals.

The above objects of the present invention are also achieved by a virtual terminal configuring device comprising: a first part managing terminal management information concerning a plurality of communication terminals of a user; a second part identifying, when a call addressed to the user is initiated, one or more terminals that can accept the call by referring to an ability needed for a communication involved in the call and the terminal management information concerning the plurality of communication terminals managed by said first part; and a third part separating information involved in the call into items of information to be sent to the above one or more terminals identified by the second part and combining items of information from the above one or more terminals identified by the second part into information to be sent to one of the plurality of communication terminals that initiates the call. A virtual terminal being formed by the above one or more terminals identified by the second part and communicates with the above one of the plurality of communication terminals.

The above objects of the present invention are also achieved by a device comprising: a plurality of communication terminals of users; and a virtual terminal configuring device to which the plurality of communication terminals are coupled. The virtual terminal configuring device comprises: a first part managing terminal management information concerning the plurality of communication terminals; a second part identifying, when a call addressed to a first one of the users is initiated, one or more terminals of the first one of the users that can accept the call by referring to an ability needed for a communication involved in the call and the terminal management information concerning the communication terminals; and a third part separating information involved in the call into items of information to be sent to the above one or more terminals identified by the second part and combining items of information from the above one or more terminals identified by the second part into information to be sent to one of the communication terminals of a second one of the users that initiates the call. A virtual terminal is formed by the above one or more terminals identified by the second part so that the virtual terminal of the first one of the users and the above one of the communication terminals of the second user can communicate with each other.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1:
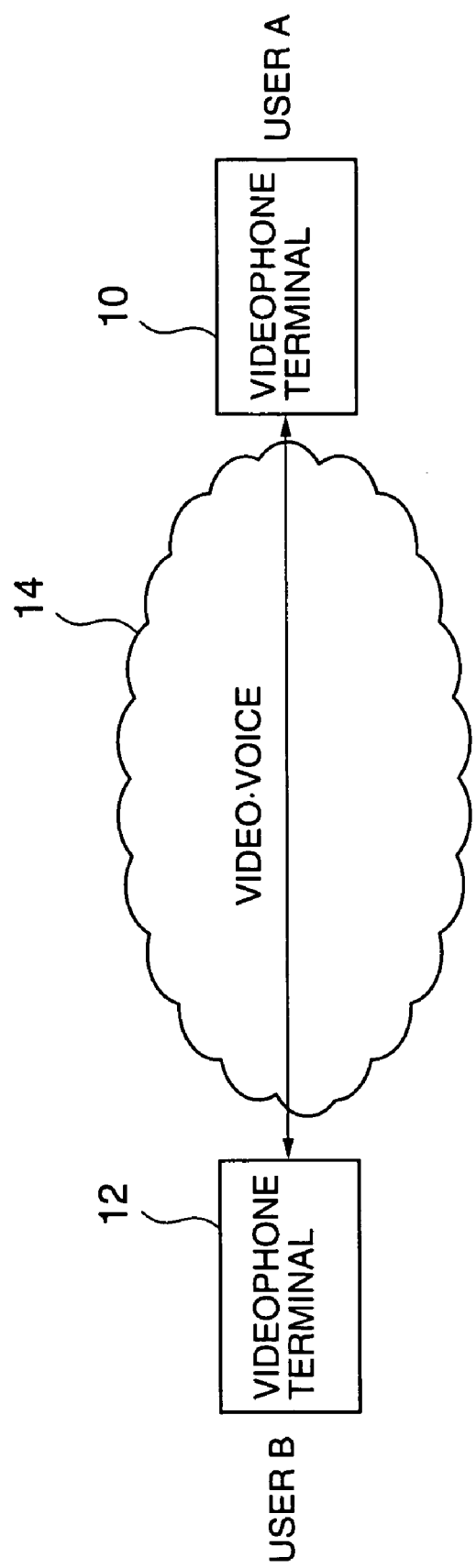
FIG. 1 is a diagram of a conventional videophone communication system.
Figure 2:
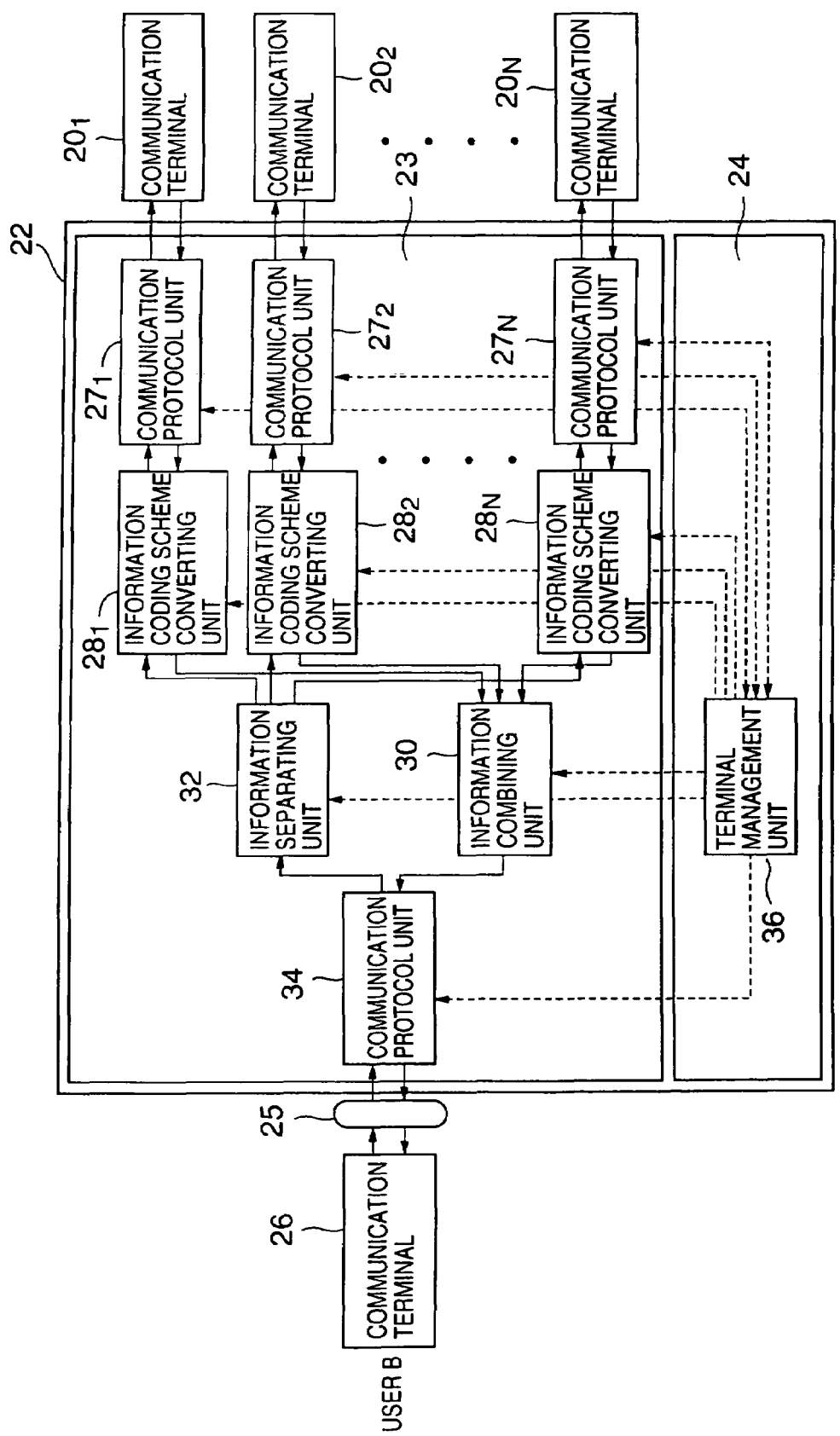
FIG. 2 is a block diagram of a communication system including a virtual terminal configuring device according to a first embodiment of the present invention.

FIG. 2 is a block diagram of a communication system of a virtual terminal configuring device according to a first embodiment of the present invention.

Referring to FIG. 2, user A is allowed to use communication terminals $20_1$ through $20_N$, which are connected to a virtual terminal configuring device 22. The virtual terminal configuring device 22 is connected, via a network 25, to a communication terminal 26 allowed to be used by user B. The communication terminals $20_1$ through $20_N$ are capable of inputting and outputting various kinds of information, such as voices, images, characters and numeral values. The communication terminal 26 is capable of integrally inputting and outputting the various kinds of information as those handled by the communication terminals $20_1$ through $20_N$.

The virtual terminal configuring device 22 is primarily made up of a virtual terminal function unit 23 and a device management function unit 24. The virtual terminal function 23 has communication protocol units $27_1$ through $27_N$, to which the communication terminals $20_1$ through $20_N$ are connected, respectively. Thus, two-way communications can take place between the communication terminals $20_1$ through $20_N$ and the communication protocol units $27_1$ through $27_N$, respectively. The communication terminal 26 is connected, via the network 25, to a communication protocol unit 34 provided in the virtual terminal function unit 23. The communication protocol unit 34 has a communication protocol of the communication terminal 26, and communicates therewith in two ways.

The communication protocol units $27_1$ through $27_N$ are respectively connected to information coding scheme converting units $28_1$ through $28_N$, which respectively implement the mutual conversions between the information coding scheme of the communication protocol unit 34 and the information coding schemes of the communication protocol units $27_1$ through $27_N$. For example, in a virtual terminal communication, if the communication protocol unit 34 employs MPEG1 as an information coding scheme for moving pictures and one of the communication protocol units $27_1$ through $27_N$, for example, the communication protocol unit $27_1$ employs MPEG4 as an information coding scheme for moving pictures, the information coding scheme converting unit $28_1$ performs the mutual conversion between MPEG1 and MPEG4. When the information coding scheme includes information produced by data compression, the information coding scheme converting unit performs associated data decompression and data compression at the time of converting the information coding scheme. That is, data decompression and data compression are part of the work along with the conversion of the information coding scheme.

The information coding scheme converting units $28_1$ through $28_N$ have a filtering function. The filtering function is used in case where there is a large difference between the bit rate of channels of the network 25 to which the communication protocol unit 34 is connected and the bit rate of channels of a network to which the communication protocol units $27_1$ through $27_N$ are connected. In the above case, the filtering function extracts information assigned comparatively high priority from the entire information. With the filtering function, it is possible to reduce the amount of information handled by an information coding scheme used in a comparatively high bit rate to the amount of information handled by another information coding scheme used in a comparatively low bit rate.

The items of information respectively output by the information coding scheme converting units $28_1$ through $28_N$ are supplied to an information combining unit 30. Then, the information combining unit 30 combines the items of information which are supplied from the information coding scheme converting units $28_1$ through $28_N$ and are processed by the same information coding scheme. The combined or multiplexed information thus obtained is supplied to the communication protocol unit 34, which sends the synthesized information from the information combining unit 30 to the communication terminal 26.

The communication protocol 34 supplies information received from the communication terminal 26 to an information separating unit 32. The information separating unit 32 separates the multiplexed information into the respective kinds of information such as voices, images, characters and numeral values. The kinds of information are supplied to the corresponding information coding scheme converting units $28_1$ through $28_N$. Then, the converting units $28_1$ through $28_N$ convert the information of the information coding scheme employed in the communication protocol unit 34 into the respective information coding schemes of the communication protocol units $27_1$ through $27_N$, and supply the items of the converted information thereto.

The device management function unit 24 of the virtual terminal configuring device 22 includes a terminal management unit 36. The terminal management unit 36 is informed, by the communication protocol units $27_1$ through $27_N$ and 34 of the virtual terminal function unit 23, of a variety of management information on the communication terminals $20_1$ through $20_N$, such as the kinds of information handled thereby, functions, human interface abilities, communication abilities and communication status (indicating whether a requested communication should be allowed) of the communication terminals $20_1$ through $20_N$. Then, in accordance with the kinds of information that are input to and output from the communication terminals $20_1$ through $20_N$, the terminal management unit 36 supplies control signals to the communication protocol units $27_1$ through $27_N$ and 34, the information coding scheme converting units $28_1$ through $28_N$, the information combining unit 30 and the information separating unit 32 in order to control the operations thereof.

When the communication terminal 26 of user B initiates a call addressed to any of the communication terminals $20_1$ through $20_N$ of user A, the device management function unit 24 checks the abilities of communication terminals of user A which are available for communications at that time by referring to the human interface and communication abilities needed by the communication terminal 26. Then, the device management function unit 24 identifies communication terminals which can accept the call made by the communication terminal 26. The selected communication terminal among the communication terminals $20_1$ through $20_N$ of user A is virtually integrated into a single communication terminal (virtual terminal) by the virtual terminal function unit 23. Thus, a communication can take place between the virtual terminal thus constructed and the communication terminal 26 of user B.

Figure 3:
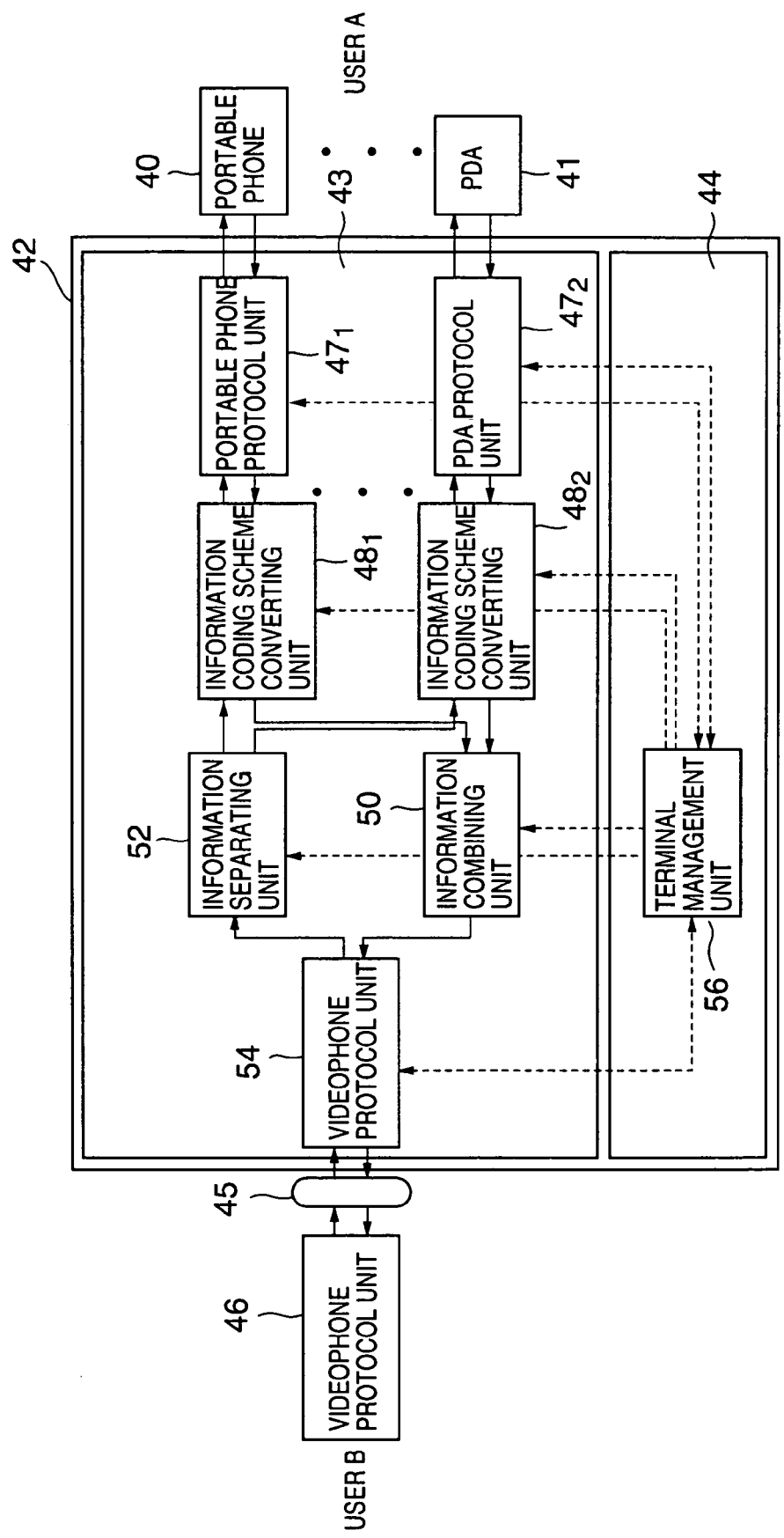
FIG. 3 is a block diagram of a communication system including a virtual terminal configuring device according to a second embodiment of the present invention.

FIG. 3 is a block diagram of a communication system of a virtual terminal configuring device according to a second embodiment of the present invention.

Referring to FIG. 3, a cellular phone 40 and a PDA 41 that can be used by user A are connected to a virtual terminal configuring device 42. The virtual terminal configuring device 42 is connected, via a network 45, to a videophone communication terminal 46 that can be used by user B.

The virtual terminal configuring device 42 is primarily made up of a virtual terminal function unit 43 and a device management function unit 44. The cellular phone 40 and the PDA 41 are respectively connected to communication protocol units $47_1$ and $47_2$ in the virtual terminal function unit 43. Thus, two-way communications can take place between the cellular phone 40 and the communication protocol unit $47_1$ and between the PDA 41 and the communication protocol unit $47_2$. The videophone communication terminal 46 is connected, via the network 45, to a communication protocol unit 54 provided in the virtual terminal function unit 43. The videophone communication terminal 46 and the communication protocol unit 54 communicate with each other in two ways.

The communication protocol units $47_1$ and $47_2$ are respectively connected to the information coding scheme converting units $48_1$ and $48_2$. The information coding scheme converting unit $48_1$ converts voice information of the information coding scheme employed in the cellular phone supplied by the communication protocol unit $47_1$, into voice information of the information coding scheme employed in the videophone. The converted voice information thus obtained is supplied to an information combining unit 50. The information coding scheme converting unit $48_2$ converts video information of the information coding scheme for the PDA supplied by the communication protocol unit $47_2$ into video information of the information coding scheme for the videophone. The converted video information thus obtained is supplied to the information combining unit 50. For example, when information supplied from the PDA 41 forms a still picture, it is converted into video information describing animation by the information coding scheme converting unit $48_2$. The information coding scheme converting units $48_1$ and $48_2$ are respectively equipped with the filtering functions.

The information combining unit 50 combines the voice and video information of the information coding scheme for the videophone respectively supplied from the information coding scheme converting units $48_1$ and $48_2$ into integrated videophone information conforming to the videophone. The integrated videophone information is then sent to the communication protocol unit 54, which sends the received videophone information to the videophone communication terminal 46 via the network 45.

The communication protocol unit 54 supplies videophone information received from the videophone communication terminal 46 to an information separating unit 52. Then, the information separating unit 52 separates the received videophone information into voice information and video information, which are respectively supplied to the information coding scheme converting units $48_1$ and $48_2$. Then, the unit $48_1$ converts the voice information conforming to the videophone into voice information conforming to the cellular phone. The voice information thus converted is then supplied to the communication protocol unit $47_1$. Similarly, the unit $48_2$ converts the video information conforming to the videophone into video information conforming to the cellular phone. The video information thus converted is then supplied to the communication protocol unit $47_2$.

The device management function unit 42 of the virtual terminal configuring device 42 includes a terminal management unit 56. The terminal management unit 56 is informed, by the communication protocol units $47_1$ $47_2$ and 54 of the virtual terminal function unit 43, of a variety of management information on the cellular phone 40, the PDA 41 and the videophone communication terminal 46, such as the kinds of information handled thereby, functions, human interface abilities, communication abilities and communication status of the cellular phone 40, the PDA 41 and the videophone communication terminal 46. Then, in accordance with the kinds of information that are input to and output from the cellular phone 40, the PDA 41 and the videophone communication terminal 46, the terminal management unit 56 supplies control signals to the communication protocol units $47_1$, $47_2$ and 54, the information coding scheme converting units $48_1$ and $48_2$, the information combining unit 50 and the information separating unit 52 in order to control the operations thereof.

When the videophone communication terminal 46 of user B makes a call addressed to either the cellular phone 40 or the PDA 41 of user A, the device management function unit 44 checks the abilities of communication terminals of user A which are available for communications at that time by referring to the human interface and communication abilities needed by the videophone communication terminal 46. Then, the device management unit 44 identifies the cellular phone 40 or the PDA 41 which can accept the call made by the videophone communication terminal 46. The selected terminal of user A is virtually integrated into a single communication terminal (virtual terminal) by the virtual terminal function unit 43. Thus, a communication can take place between the virtual terminal and the videophone communication terminal 46 of user B.

Figure 4:
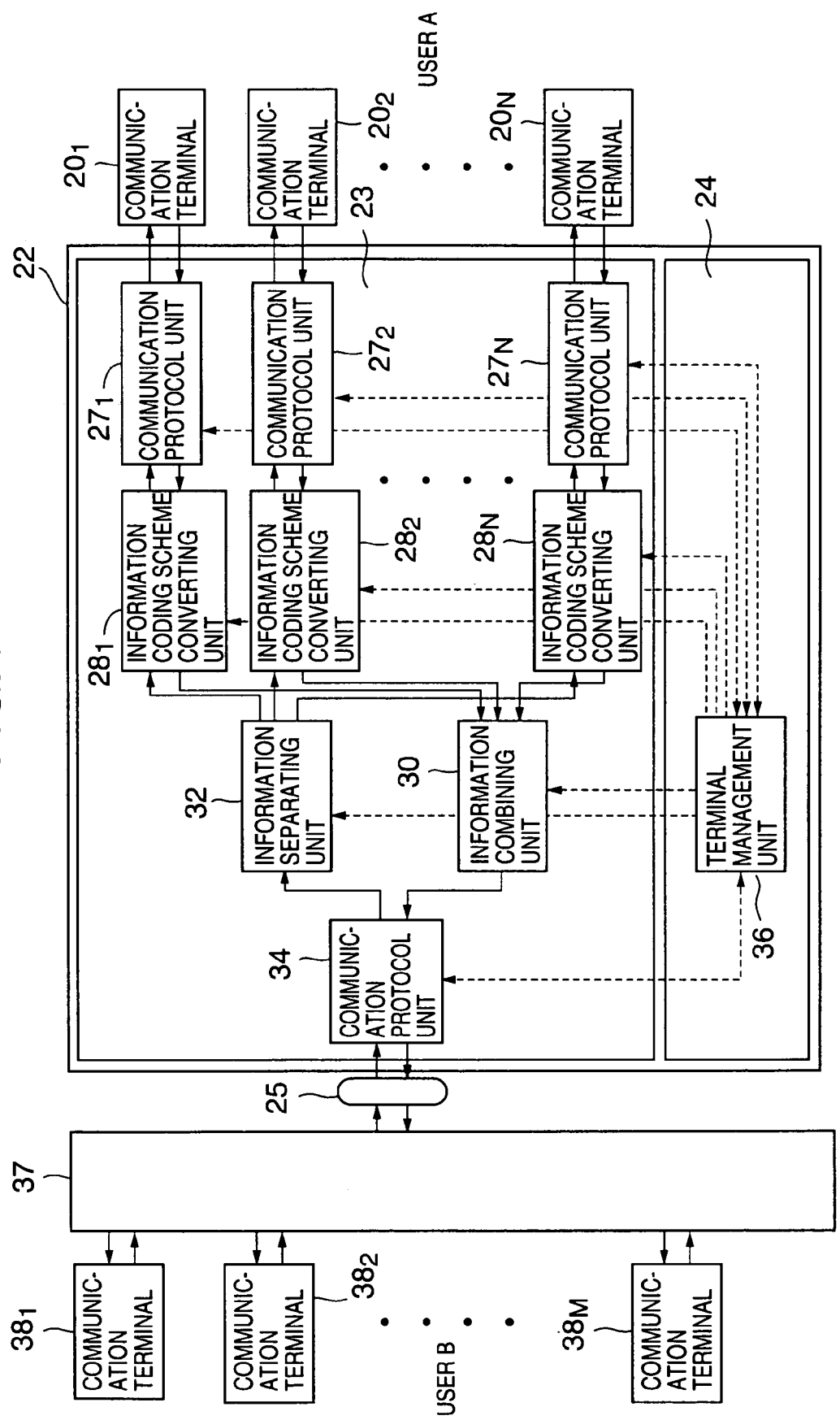
FIG. 4 is a block diagram of a communication system including a virtual terminal configuring device according to a third embodiment of the present invention.

FIG. 4 is a block diagram of a communication system of a virtual terminal configuring device according to a third embodiment of the present invention. Any part shown in FIG. 2 that is the same as a part shown in FIG. 4 is denoted by the same reference numeral in both figures. A virtual terminal configuring device 37 is substituted for the communication terminal 26 and is connected to the network 25. The virtual terminal configuring device 37 has the same configuration and operation as those of the virtual terminal configuring device 22. Communication terminals $38_1$ through $38_M$ that can be used by user B are connected to the virtual terminal configuring device 37.

With the above configuration, the communication terminals $20_1$ through $20_N$ that can be used by user A are virtually integrated into a single communication terminal (virtual terminal) by means of the virtual terminal configuring device 22, and the communication terminals $38_1$ through $38_M$ that can be used by user B are virtually integrated into a single communication terminal (virtual terminal) by means of the virtual terminal configuring device 37. Thus, a communication can take place between the virtual terminal devices of users A and B.

Figure 5:
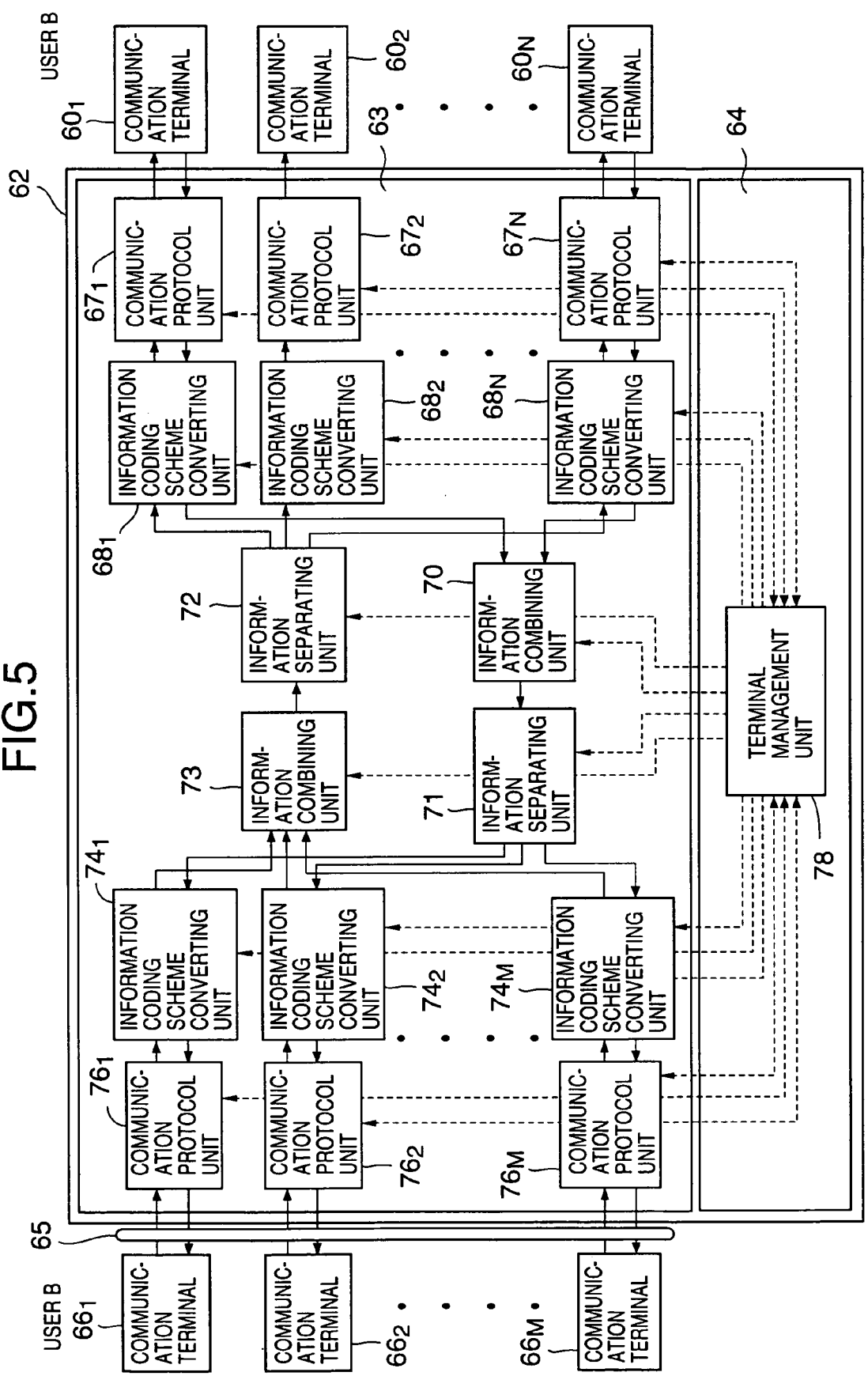
FIG. 5 is a block diagram of a communication system including a virtual terminal configuring device according to a fourth embodiment of the present invention.

FIG. 5 is a block diagram of a communication system of a virtual terminal configuring device according to a fourth embodiment of the present invention. Communication terminals $60_1$ through $60_N$ that can be used by user A are connected to a virtual terminal configuring device 62, which is connected, via the network 25, to communication terminals $66_1$ through $66_M$ that can be used by user B. The communications terminals $60_1$ through $60_N$ and $66_1$ through $66_M$ are capable of inputting and outputting various kinds of information such as voices, images, characters and numeral values.

The virtual terminal configuring device 62 is primarily made up of a virtual terminal function unit 63 and a device management function unit 64. The communication terminals $60_1$ through $60_N$ are respectively connected to associated communication protocol units $67_1$ through $67_N$ provided in the virtual terminal function unit 63. Thus, two-way communications take place between the communication terminals $60_1$ through $60_N$ and the communication protocol units $67_1$ through $67_N$, respectively. The communication terminals $66_1$ through $66_M$ are connected to associated communication protocol units $76_1$ through $76_M$ provided in the virtual terminal function unit 63. Thus, two-way communications can take place between the communication terminals $66_1$ through $66_M$ and the communication protocol units $76_1$ through $76_M$.

The communication protocol units $67_1$ through $67_N$ are connected to information coding scheme converting units $68_1$ through $68_N$. The units $68_1$ through $68_N$ convert the items of information that are supplied from the communication protocol units $67_1$ through $67_N$ and conform to the respective information coding schemes into information of a common information coding scheme. Then, the information of the common information coding scheme is supplied to an information combining unit 70. Each of the information coding scheme converting units $68_1$ through $68_N$ has the aforementioned filtering function.

The information combining unit 70 combines the items of information of the common coding scheme respectively supplied from the information coding scheme converting units $68_1$ through $68_N$, and thus produces combined or multiplexed information, which is then supplied to an information separating unit 71. The information separating unit 71 separates the multiplexed information into the respective kinds of information such as voices, images, characters and numeral values. The respective kinds of information thus obtained are supplied to the corresponding information coding scheme converting units $74_1$ through $74_N$. Then, the converting units $74_1$ through $74_N$ convert the information of the common information coding scheme into the respective information coding schemes of the communication protocol units $76_1$ through $76_N$, and supply the items of the converted information thereto. Each of the information coding scheme converting units $74_1$ through $74_M$ has the aforementioned filtering function. The communication protocol units $76_1$ through $76_M$ send the respective kinds of information thus obtained to the corresponding communication terminals $66_1$ through $66_M$.

The communication protocol units $76_1$ through $76_M$ supply various kinds of information such as voices, images, characters and numeral values received from the communication terminals $66_1$ through $66_M$ to the information coding scheme converting units $74_1$ through $74_N$, respectively. The corresponding information coding scheme converting units $74_1$ through $74_N$ convert the items of information of the respective information coding schemes into information of the common information coding scheme. The information thus obtained is then supplied to an information combining unit 73.

The information combining unit 73 combines the items of the information data of the common information coding scheme respectively supplied from the information coding scheme converting units $74_1$ through $74_M$, and supplies the combined or multiplexed data to an information separating unit 72. The information separating unit 72 separates the multiplexed information into the respective kinds of information such as voices, images, characters and numeral values. Then, the respective kinds of information are supplied to the corresponding information coding scheme converting units $68_1$ through $68_N$. The units $68_1$ through $68_N$ convert the information of the common information coding scheme supplied from the information separating unit 72 into the items of information of the respective information coding schemes of the communication protocol units $67_1$ through $67_N$. The items of information thus converted are then supplied to the communication protocol units $76_1$ through $76_N$, which send the corresponding items of information to the communication terminals $60_1$ through $60_N$.

The device management function unit 64 of the virtual terminal configuring device 62 includes a terminal management unit 78. The terminal management unit 78 is informed, by the communication protocol units $67_1$ through $67_N$ and $76_1$ through $76_M$ a of the virtual terminal function unit 63, of a variety of management information on the communication terminals $60_1$ through $60_N$ and $66_1$ through $66_M$, such as the kinds of information handled thereby, functions, human interface abilities, communication abilities and communication status of the communication terminals $60_1$ through $60_N$ and $66_1$ through $66_M$. Then, in accordance with the kinds of information that are input to and output from the communication terminals $60_1$ through $60_N$ and $66_1$ through $66_M$, the terminal management unit 78 supplies control signals to the communication protocol units $67_1$ through $67_N$. $76_1$ through $76_M$, the information coding scheme converting units $68_1$ through $68_N$ and $74_1$ through $74_M$, the information combining units 70 and 73, and the information separating units 71 and 72 in order to control the operations thereof.

Thus, the communication terminals $20_1$ through $20_N$ that can be used by user A are virtually integrated into a single communication terminal (virtual terminal) by means of the virtual terminal configuring device 62, and similarly the communication terminals $66_1$ through $66_M$ that can be used by user B. With the virtual terminal configuring device 62, the virtual terminals of users A and B can communicate with each other.

In the above-mentioned embodiments of the present invention, the virtual terminal configuring device which virtually integrates the communication terminals is installed on the user side and is connected to the network. However, the present invention is not limited to the above formation.

The virtual terminal configuring devices 22, 42 and 62 can be implemented by the function of software. Similarly, the virtual terminal function units 23, 43 and 63 can be implemented by the function of software, and the device management function units 24, 44 and 64 can be implemented by the function of software. The virtual terminal function units 23, 43 and 63 may be provided as devices separate from (for example, remote from) the device management function units 24, 44 and 64.

A description will be given of other embodiments of the present invention.

Figure 6:
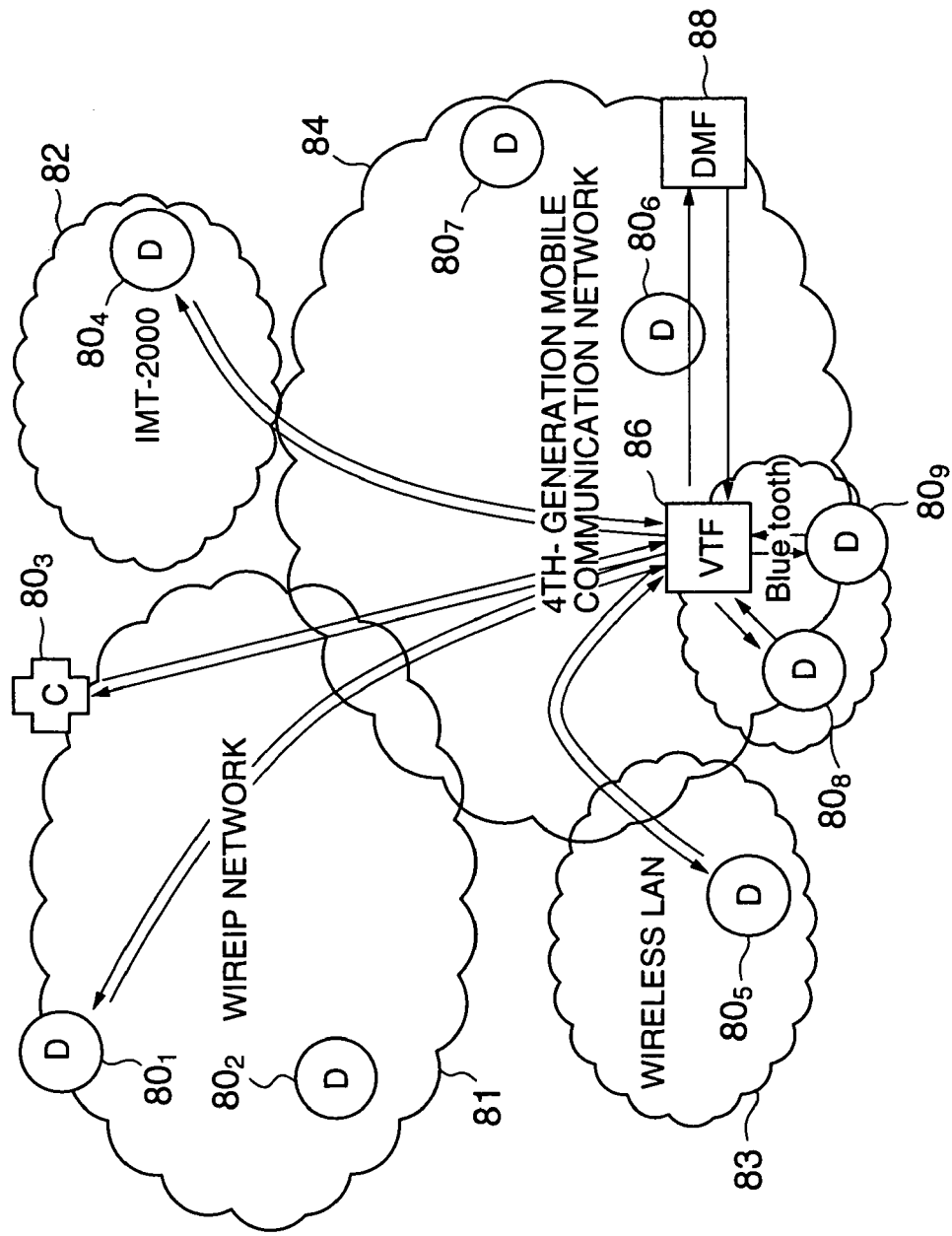
FIG. 6 is a diagram of a network structure of a communication system including the virtual terminal configuring system of the present invention.

FIG. 6 is a diagram of a network structure of a communication system using the virtual terminal configuring device according to any of the first through fourth embodiments of the present invention. Referring to FIG. 6, communication terminals $80_1$ through $80_3$ are connected to a wire IP network 81. A communication terminal $80_4$ is connected to an IMT-2000 (which is the next generation mobile communications system). A communication terminal $80_5$ is connected to a wireless LAN 83. Communication terminals $80_6$ and $80_7$ are connected to a fourth-generation mobile communication system 84.

A virtual terminal function device(VTF) 86 and a device management function device (DMF) 88, which form a virtual terminal configuring device, are connected to the fourth-generation mobile communication system 84, and are thus connected mutually. Communication terminals $80_8$ and $80_9$ are connected to the virtual terminal function device 86 by Bruetooth (a radio communication interface).

The virtual terminal function device 86 corresponds to one of the aforementioned virtual terminal function units 23, 43 and 63 respectively shown in FIGS. 2, 4 and 5. The device management function device 88 corresponds to one of the aforementioned device management units 24, 44 and 64 respectively shown in FIGS. 2, 4 and 5.

Each of the networks 25, 45 and 65 shown in FIGS. 2 through 5 correspond to the whole network shown in FIG. 6. The virtual terminal function unit 23 and the device management unit 24 shown in FIGS. 2 and 4 can be installed in any position in the whole network. Similarly, the virtual terminal function unit 43 and the device management unit 44 shown in FIG. 3 can be installed in any position in the whole network, and the virtual terminal function unit 63 and the device management unit 64 shown in FIG. 5 can be installed in any position in the whole network. In the network shown in FIG. 6, the virtual terminal function management device 86 and the device management function device 88 are connected to the fourth-generation mobile communication network, as has been described previously.

In FIG. 6, the virtual terminal function device 86 and the device management function device 88 are installed separate from each other. Alternatively, the device management function device 88 can be incorporated with the virtual terminal function device 86 so that these devices are installed in the same position in the network.

The virtual terminal function device 86 and the device management function device 88 can be implemented by the function of software.

Figure 7:
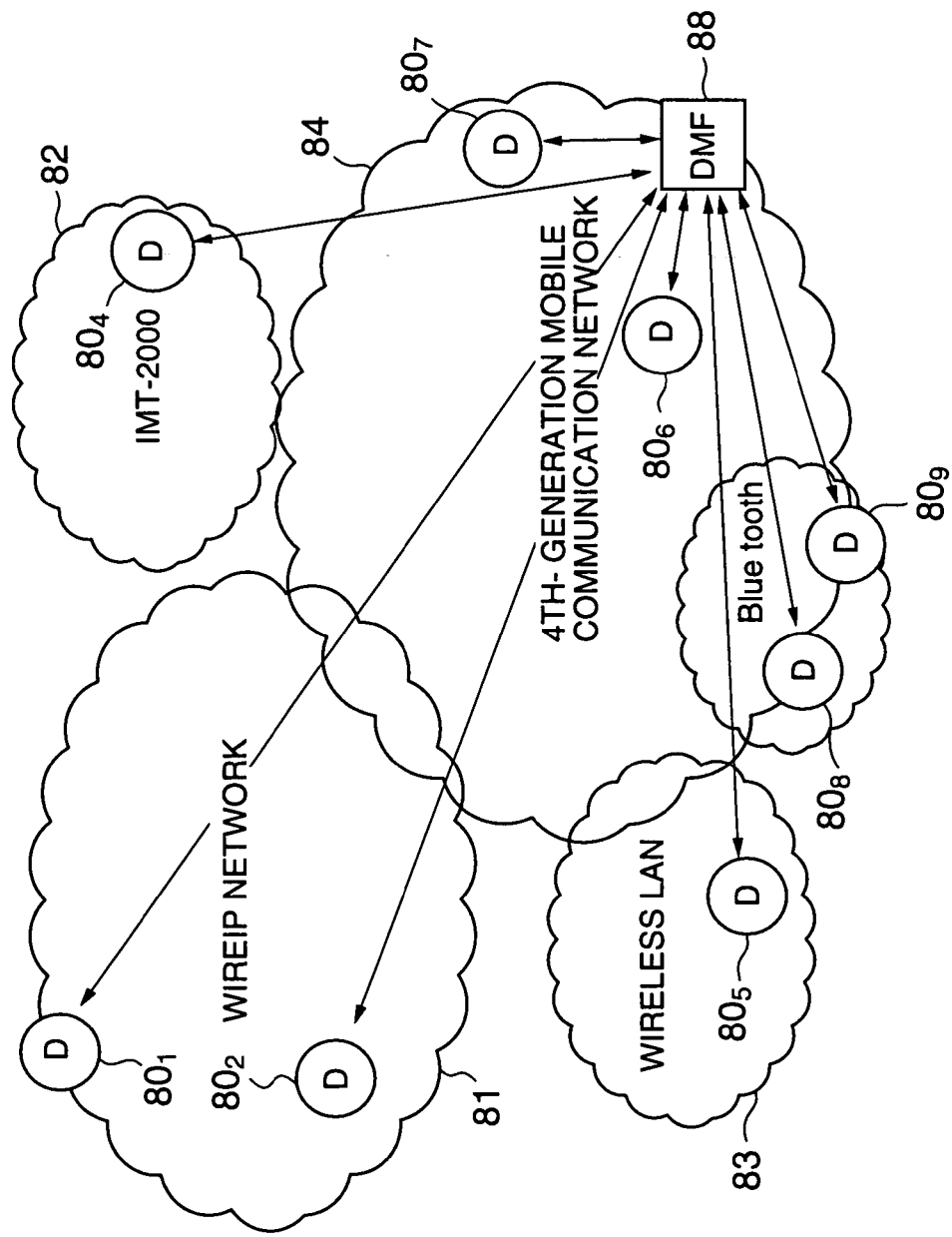
FIG. 7 is a diagram showing how a device management function unit acknowledges kinds of information handled by communication terminals.

As shown in FIG. 7, the device management function device 88 communicates with the communication terminals $80_1$ through $80_9$ and thus acknowledges management information on the communication terminals $80_1$ through $80_9$, such as the kinds of information handled thereby, functions, human interface abilities, communication abilities and communication status of the communication terminals $80_1$ through $80_9$. Alternatively, the device management function device 88 may access the communication terminals $80_1$ through $80_N$ and collect a variety of management information on the communication terminals $80_1$ through $80_9$, such as the kinds of information handled thereby as well as functions, human interface abilities, communication abilities and communication status of the communication terminals $80_1$ through $80_9$.

Figure 8:
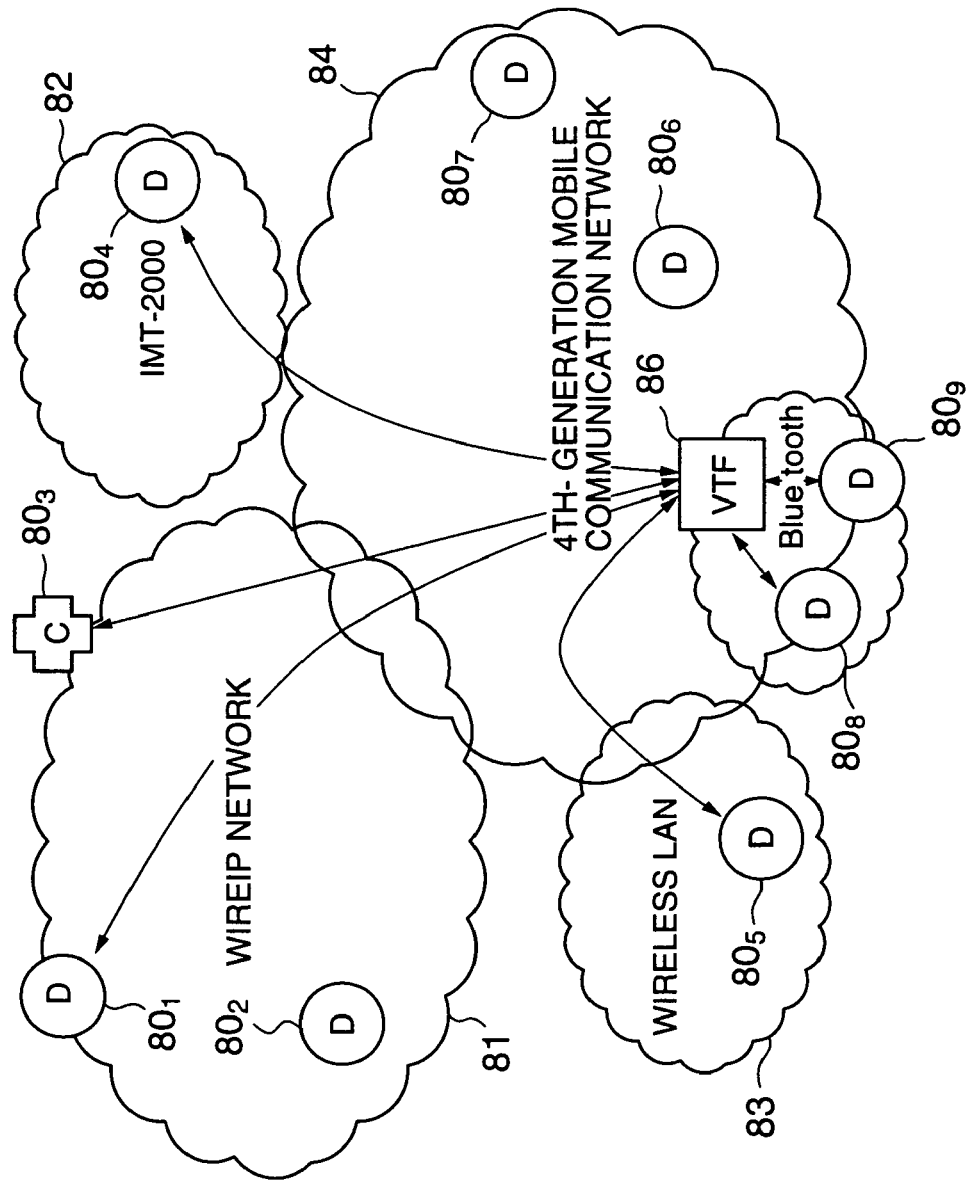
FIG. 8 is a diagram showing how the device management function unit integrates communication terminals coupled to a network.

The virtual terminal function device 86 acquires a control signal from the device management function device 88 via the fourth-generation mobile communication network 84. Thus, as shown in FIG. 8, the communication terminals $80_1$, $80_4$, $80_5$, $80_8$ and $80_9$ that can be used by user A are virtually integrated into a single communication terminal (virtualterminal), and can communicate with the communication terminal $80_3$ that can be used by user B.

Each of the above-mentioned communication terminals has any of an audio input function, an image input function, a character input function, a numeral value input function such as a sensor, an acoustic output function, an image output function, a character output function, a memory function, an information converting function such as speech codec. For example, the communication terminal $80_3$ of user B shown in FIG. 8 is a videophone communication terminal, and the communication terminal $80_1$ of user A is a video camera installed at a street corner. The communication terminal $80_4$ is a cellular phone, and the communication terminal $80_5$ is a large-size display. The communication terminal $80_8$ is a PDA, and the communication terminal $80_9$ is a hard disk drive.

In light of the relationship between the relative positions of the virtual terminal function device 86 and the device management function device 88 is considered, when the virtual terminal function device 86 and the device management function device 88 are arranged in a server, communications therebetween are implemented by the function of software. When the virtual terminal function device 86 and the device management function device 88 are arranged in different servers, communications therebetween take place via one or a plurality of networks linked together.

In light of the relationship between the absolute positions of the virtual terminal function device 86 and the device management function device 88, it is possible to employ the following two arrangements. In the first arrangement, the virtual terminal function device 86 and the device management function device 88 are installed in a terminal that is not owned by any user. In the second arrangement, the virtual terminal function device 86 and the device management function device 88 are installed in a terminal owned by a user. In the first arrangement, the virtual terminal function device 86 and the device management function device 88 are installed in a server connected to a plurality of kinds of networks in which a terminal used as a virtual terminal exists. In the second arrangement, the virtual terminal function device 86 and the device management function device 88 are installed in a terminal that can be connected to a plurality of kinds of networks. The present invention is not limited to the specifically disclosed embodiments, and variations and modifications may be made without departing from the scope of the present invention.

The present application is based on Japanese priority application no. 11-375794 filed on Dec. 28, 1999, the entire contents of which are hereby incorporated by reference.

What is claimed is:

1. An apparatus for configuring a virtual terminal that includes a plurality of communication devices accessible to the apparatus, comprising:

a signal interface configured to receive a calling signal from a calling terminal, said calling signal including at least a first content part and a second content part, said second content part containing information of a different media content than said first content part;

an information separating unit configured to separate said first content part from said second content part of said calling signal;

a terminal management unit configured to identify communication attributes of the plurality of communication devices accessible to said terminal management unit and identify which of said plurality of devices are capable of processing information corresponding to at least one of said first content part and said second content part; and a virtual terminal interface configured to send information corresponding to said first content part to a first communication device identified by said terminal management unit as being capable of processing said information of said first content part, and send information corresponding to said second content part to a second communication device identified by said terminal management unit as being capable of processing information of the second content part, wherein each of the first communication device and the second communication device is one of the plurality of communication devices.

2. The apparatus as claimed in claim 1, further comprising:

a format conversion mechanism configured to convert the at least one of the first content part and the second content part into corresponding items of information coded according to respective information coding schemes employed in the respective communication devices identified by said terminal management unit.

3. The apparatus as claimed in claim 1, wherein the communication attributes includes predetermined communication abilities of the plurality of communication devices.

4. The apparatus of claim 3, wherein:
said communication attributes include at least one of a coding scheme, media content processing capability, audio format processing capability, and video format processing capability.

5. The apparatus as claimed in claim 1, wherein said terminal management unit compresses and expands the at least one of the first content part and the second content part in accordance with communication abilities of the respective communication devices identified by said terminal management unit.

6. The apparatus as claimed in claim 1, wherein said terminal management unit filters the respective first content part and said second content part in accordance with communication abilities of the respective communication devices identified by said terminal management unit.

7. The apparatus of claim 1, wherein:
said calling signal is at least one of a multi-media signal, a communication session signal and a video conference signal.

8. The apparatus of claim 1, further comprising:
a conversion mechanism configured to convert a signal scheme of said first content part into another signal scheme, wherein
said terminal management unit being configured to identify said first communication device as being capable of processing data in said another format.

9. The apparatus of claim 8, wherein:
said conversion mechanism being configured to convert from a first MPEG format to a second MPEG format.

10. The apparatus of claim 1, wherein:
said first content part including digital data that is representative of an audio signal.

11. The apparatus of claim 1, wherein:
said second content part including digital data that is representative of a video signal.

12. The apparatus of claim 1, wherein the virtual terminal interface includes a radio communication interface.

13. The apparatus of claim 1, wherein the virtual terminal interface includes a network interface.

14. The apparatus of claim 1, wherein:
said first terminal being at least one of a cell phone, PDA, videophone and personal computer.

15. The apparatus of claim 1, further comprising:
a filtering mechanism configured to extract information from said first content part so as to reduce an amount of said information that said virtual terminal interface sends to said first terminal.

16. The apparatus of claim 1, wherein:
said information that corresponds to said first content part being a digital representation of a voice signal, an image, a character and a numeral value.

17. The apparatus of claim 1, wherein:
said information separating unit is at least partially implemented in software executed by a processor.

18. The apparatus of claim 1, wherein:
said terminal management unit is at least partially implemented in software executed by a processor.

19. The apparatus of claim 1, wherein:
said calling terminal initiates a communication session by sending said calling signal to said signal interface.

20. The apparatus of claim 1, wherein:
said first communication device and said second communication device do not initiate a communication session with said calling terminal.

21. A virtual terminal configuring method, comprising:
(a) managing terminal management information associated with a plurality of communication devices, said terminal management information including indicia of communication attributes of the plurality of communication devices;
(b) inputting a calling signal from a calling terminal to an apparatus for configuring a virtual terminal, said calling signal containing a first content part and a second content part;
(c) identifying communication attributes of the plurality of communication devices, and identifying which of said plurality of communication devices are capable of processing information corresponding to at least one of said first content part and said second content part;
(d) separating said calling signal into said first content part and said second content part; and
(e) sending information corresponding to said first content part to a first communication device identified in said identifying step as being capable of processing said information of said first content part, and sending information corresponding to said second content part to a second communication device identified in said identifying step as being capable of processing information of the second content part, wherein each of the first communication device and the second communication device is one of the plurality of communication devices.

22. A communication system, comprising:
a plurality of communication devices; and
a virtual terminal configuring device to which the plurality of communication devices are communicatively coupled,
said virtual terminal configuring device including,
a signal interface configured to receive a calling signal from a calling terminal, said calling signal including at least a first content part and a second content part, said second content part containing information of a different media content than said first content part;
an information separating unit configured to separate said first content part from said second content part of said calling signal;
a terminal management unit configured to identify communication attributes of the plurality of communication devices accessible to said terminal management unit and identify which of said plurality of devices are capable of processing information corresponding to at least one of said first content part and said second content part; and
a virtual terminal interface configured to send information corresponding to said first content part to a first communication device identified by said terminal management unit as being capable of processing said information of said first content part, and send information corresponding to said second content part to a second communication device identified by said terminal management unit as being capable of processing information of the second content part, wherein
a virtual terminal being formed by said virtual terminal configuring device and communication devices identified by said terminal management unit so that said virtual terminal and said calling terminal are configured to communicate with each other, wherein each of the first communication device and the second communication device is one of the plurality of communication devices.

* * * * *